US010486405B2

(12) United States Patent
Suthar et al.

(10) Patent No.: US 10,486,405 B2
(45) Date of Patent: Nov. 26, 2019

(54) NANOMATERIAL ASSISTED BONDING METHOD TO PRODUCE CURVED SURFACES

(71) Applicant: U.S. Department of Energy, Washington, DC (US)

(72) Inventors: Kamleshkumar Suthar, Naperville, IL (US); Marion M. White, Willowbrook, IL (US)

(73) Assignee: U.S. Department of Energy, Washington, DC (US)

( * ) Notice: Subject to any disclaimer, the term of this patent is extended or adjusted under 35 U.S.C. 154(b) by 193 days.

(21) Appl. No.: 15/872,011

(22) Filed: Jan. 16, 2018

(65) Prior Publication Data

US 2019/0217592 A1    Jul. 18, 2019

(51) Int. Cl.
*B32B 37/10*    (2006.01)
*B32B 37/06*    (2006.01)
*B32B 1/00*    (2006.01)
*B32B 37/08*    (2006.01)

(52) U.S. Cl.
CPC ............... *B32B 37/10* (2013.01); *B32B 1/00* (2013.01); *B32B 37/06* (2013.01); *B32B 37/08* (2013.01)

(58) Field of Classification Search
None
See application file for complete search history.

(56) References Cited

U.S. PATENT DOCUMENTS

| | | | | |
|---|---|---|---|---|
| 2005/0175853 A1* | 8/2005 | De La Prieta | ........ | C04B 37/006 428/615 |
| 2008/0145695 A1* | 6/2008 | Duckham | ............ | B23K 1/0006 428/686 |

FOREIGN PATENT DOCUMENTS

WO    WO-2009/149153 A2 *  12/2009

* cited by examiner

*Primary Examiner* — Jeffry H Aftergut
(74) *Attorney, Agent, or Firm* — Karen L. Blouin; Michael J. Dobbs; Brian J. Lally (57) ABSTRACT

A method of fabricating a curved surface bonding technique using low melting temperature nanoparticles or nanofilms/nanoparticles of reactive metals as eutectic compounds. The ability of nanomaterials to melt at low temperature lowers the bonding temperature and reduces/eliminates the residual stresses generated in bulk material during the bonding process of two materials with different coefficients of thermal expansion. The nanoscale materials will then be integrated and the new bond will assume properties of the bulk material, including its higher melting temperature.

7 Claims, 7 Drawing Sheets

NANOMATERIAL ASSISTED BONDING METHOD TO PRODUCE CURVED SURFACES

GOVERNMENT INTERESTS

The United States Government has rights in this invention pursuant to Contract No. DE-AC02-06CH11357 between the U.S. Department of Energy (DOE) and UChicago Argonne, LLC.

FIELD OF THE INVENTION

The present invention relates to a rapid nanobonding method to produce curved surfaces.

BACKGROUND OF THE INVENTION

Metal nanoparticles can melt at significantly lower temperatures than the bulk metal. Metal nanoparticles are highly reactive due to their high surface-to-volume ratios; therefore, they can be melted at lower temperatures and can be reacted to produce compounds with other bonding materials without extensive chemical processing. For example, nano thermite materials such as a mixture of Aluminum and Nickel/Copper oxide nanoparticles can produce a very high temperature and can be reacted in a vacuum. These properties of nanomaterials can be utilized for bonding. The resulting bonds will be thermally efficient, structurally sound, and the joints will be stress free. The assimilated nanoscale materials will assume properties of the bulk material, including its higher melting temperature.

The next generation synchrotron light sources will utilizes many stress- and strain-sensitive components containing bonded dissimilar materials, some of which are critical for efficiency and high-reliability operation of the accelerators and beamlines. Due to lack of strain-free bonding techniques and methods, cooling of high crystal monochromators and mirrors is very challenging and it is often achieved by side or bottom cooling through an indium foil clamped between the optics' surface to be cooled and a copper cooling manifold. However, in order for the monochromator to efficiently diffract x-rays and preserve the incident x-ray beam wavefront, it is extremely important to keep the crystal lattice distortions to a minimum level. Therefore, the magnitude of the clamping force applied to the crystal manifold is generally a compromise between two opposing goals: achieving maximum thermal contact and minimizing mechanical and thermomechanical induced strain, which is detrimental to the performance of the x-ray optics, particularly crystal monochromators. Due to surface roughness and anomaly the contact between sink materials is <10%.

In the design of accelerator and particle physics equipment, it is often necessary to bond small parts of ceramic, glass, or nonmetals to the metals in order to keep them at a low temperature for mechanical stability and to prevent failure. Similarly, high melting temperature metals such as tungsten with copper, or titanium with SS or copper. Glidcop to Glidcop etc. are required to be bonded such a way that produces a curve or bond at the curvature.

The commonly used industrial bonding techniques of brazing or soldering are unsuitable due to the high temperature involved and the resulting strain to the bonded materials. The resulting components end up with a bend in low thermal expansion coefficient (CTE) materials and resulting micro-cracks on the top of surfaces that are required to be undamaged. Moreover, the differences in their CTE can create serious challenges in obtaining structurally and thermally reliable bonds.

Therefore, a need persists to develop a bonding technique that uses nanoparticle and nanofilms at low temperature to enhance the performance of the bond and as well produce curvature after the bonding. The proposed technique would have wide-ranging application in optics, particle physics, military, and various DOE laboratories.

SUMMARY OF THE INVENTION

According to one aspect of the invention, a method of fabricating a curved surface includes providing a first material. The first material has a temperature at a specific area. The first material also has a coefficient of thermal expansion. A second material is provided. The second material has a coefficient of thermal expansion which is less than the coefficient of thermal expansion for the first material. A predetermined area of the second material has a temperature that is cooler than the temperature of the first material. A bonding material is disposed in between the first and second materials. The bonding material is activated after the first and second materials are pressed together. The surface that is formed is allowed to cool so that the desired curvature is achieved.

BRIEF DESCRIPTION OF THE DRAWINGS

These and further aspects of the invention and their advantages can be discerned in the following detailed description, in which like characters denote like parts and in which.

DETAILED DESCRIPTION OF THE INVENTION

This invention provides a bonding technique using low melting temperature nanoparticles or nanofilms/nanoparticles of reactive metals as eutectic compounds. The proposed bonding methods can produce next-generation X-ray optics, accelerator components, and power electronics packaging applications and enable them to withstand higher operating temperatures. The proposed techniques will utilize two distinctive characteristics of nanomaterials: 1) the ability of nanoscale materials to melt at much lower temperatures than the corresponding bulk materials and 2) the ability of nanoscale materials to react aggressively to generate a localized high temperature that is required for bonding. The ability of nanomaterials to melt at low temperature lowers the bonding temperature and reduces/eliminates the residual stresses generated in bulk material during the bonding process of two materials with different coefficients of thermal expansion. The nanoscale materials will then be integrated and the new bond will assume properties of the bulk material, including its higher melting temperature. The high-reactivity of nanomaterials can be used to create a high temperature via reaction of alternately placed ultra-thin nanomaterials that will modulate the amount of heat released into the bulk material. This significant reduction in the heat intake in the bulk material reduces the recrystallization and annealing during the bonding process. Monolithic bonds will be created via formation of eutectic compounds of the nanoparticles or nanofilms and bulk constituent materials.

This invention provides a method for fabricating a curved surface. A surface is a bonded material at least a portion of which has some degree of curvature. A first material 102 is provided. (See 502, FIG. 5) The first material may be a metal, semi-conductor such as silicon, ceramic, plastic or polymer or any other material that produces acceptable results. The first material 102 has a first coefficient of thermal expansion (CTE). A coefficient of thermal expansion describes how the size of an object changes with a change in temperature. When an object is heated or cooled, its length changes by an amount proportional to the original length and the change in temperature. For example, copper has a coefficient of thermal expansion of $17 \times 10^{-6}$ which means the length of a copper rod will increase by $17 \times 10^{-6}$ units for each degree of temperature change.

The first material 102 has a first face 116, a second face 118, and a thickness 112. A predetermined area of the first material 102 has a first predetermined temperature. The first predetermined temperature is the temperature found throughout the predetermined area of the first material 102. The temperature is an approximately constant value in the cross sectional area of the entire thickness 112 of the predetermined area or from the first face 116 to the second face 118 within the bounds of the predetermined area. In some embodiments the predetermined area is the entirety of the first material 102. In alternate embodiments, the predetermined area is a subsection of the totality of the first material 102. In yet further embodiments, the first material 102 may have multiple predetermined areas at a first predetermined temperature with the remaining portions of the first material having a temperature that is less than or cooler than the first predetermined temperature.

The first material 102 may be placed on a heating element 108 to ensure that the predetermined area is at the first predetermined temperature. In one embodiment the heating element 108 is a hot plate. In other embodiments the heating element 108 is any heating element that produces acceptable results. Due to its coefficient of thermal expansion, as the first material is heated, it will expand. (See FIG. 3B)

Figure 5:
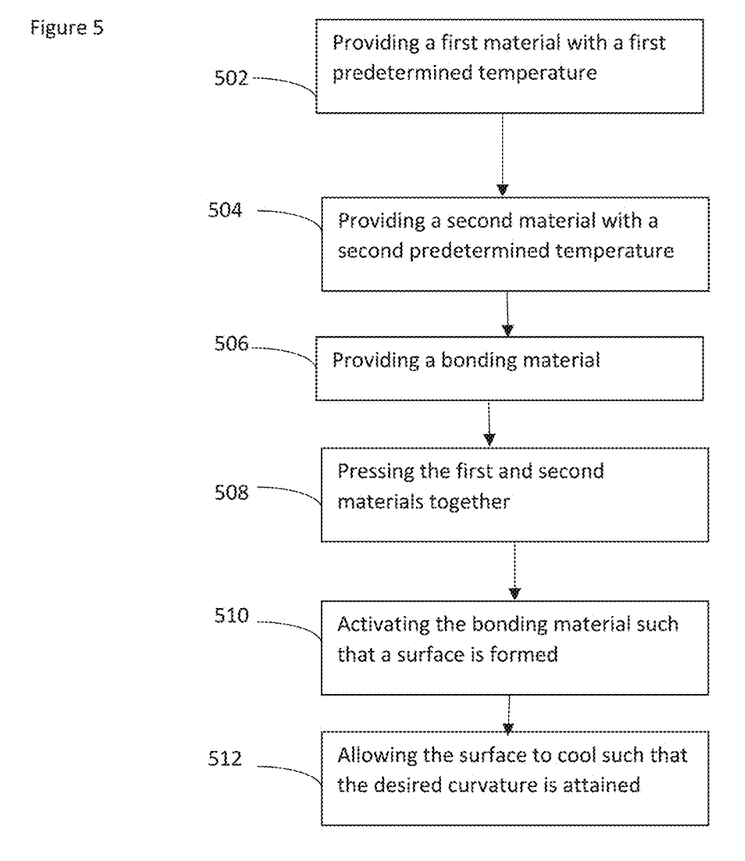
FIG. 5 is a schematic flow diagram illustrating steps in the process according to the invention.

A second material 104 is provided. (See 504. FIG. 5) The second material may be a metal, semi-conductor such as silicon, a ceramic, plastic or polymer or any other material that produces acceptable results. The second material 104 has a first face 120, a second face 122, and a thickness 114. The second material has a second coefficient of thermal expansion. The second coefficient of thermal expansion is smaller than the first coefficient of thermal expansion. The second material has a second predetermined temperature. The second predetermined temperature is the temperature found throughout approximately all of the second material. The second predetermined temperature is less than the first predetermined temperature. Importantly, the higher the difference between the first and second CTE, the smaller the difference between the first and second predetermined temperatures must be for the desired curvature. If the first and second CTE are similar, no, or very little curvature will be achieved.

In some embodiments the difference between the first and second predetermined temperatures is approximately 100 degrees Celsius. In alternate embodiments the difference between the first and second predetermined temperatures is a delta of other than 100 degrees Celsius such that acceptable results are produced. In yet further embodiments the temperature difference is low enough that the nanomaterials will not self-ignite. In alternate embodiments the temperature difference is such that the nanomaterials self-ignite.

The second material 104 may be placed on a cooling element 110 to bring the second material 104 to the second predetermined temperature. In one embodiment the cooling element 110 is a heat exchanger that provides constant cooling/heating temperature. In other embodiments the cooling element 110 is any cooling element that produces acceptable results.

Both the first and second predetermined temperatures are selected to be within a range such that two conditions are met. First, for one embodiment, the temperatures are selected to be in a range such that the nanomaterials do not self-ignite. In alternate embodiments the temperatures are selected to be in a range such that the nanomaterials self-ignite. Second, the temperatures should not be in a range such that the first or second materials 102, 104 flow before the bonding process begins.

Figure 2:
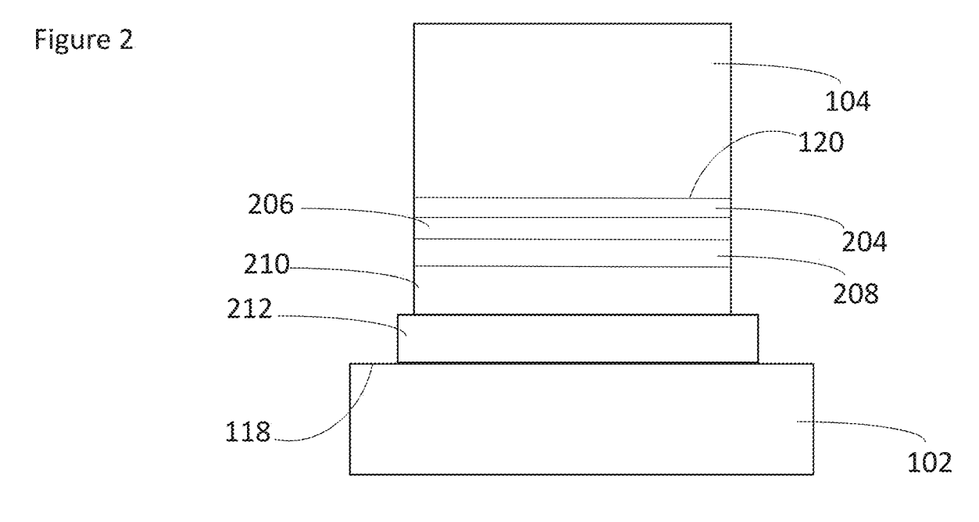
FIG. 2 is schematic view of the deposition layers and nanofoil according to one embodiment of the invention.

A bonding material 106 is provided. (See 506. FIG. 5) The bonding material 106 is disposed in between the first and second materials 102, 104 with the first material 102 being at the first predetermined temperature and the second material 104 being at the second predetermined temperature. Specifically the bonding material 106 is disposed in between the second face of the first material 118 and the first face of the second material 120. One embodiment of a bonding material 106 is illustrated in FIG. 2. Other embodiments may use different bonding materials 106 such that acceptable results are obtained.

In the embodiment illustrated in FIG. 2, a layer of tin 212 is deposited on the second face of the first material 118. The layer of tin 212 is approximately 2000 nanometers. A layer of titanium 204 is deposited on the first face of the second material 120. The layer of titanium 204 is approximately 20 nanometers. A layer of gold 206 is deposited on the layer of titanium 204. The layer of gold 206 is approximately 40 nanometers. A layer of tin 208 is deposited on the layer of gold 206. The layer of tin 208 is approximately 2000 nanometers. Any deposition technique may be used that produces acceptable results including, but not limited to, CVD, PVD, electroplating, evaporation, or sputtering.

A piece of tin coated nanofoil 210 is placed in between the layers of tin. In one embodiment the nanofoil 210 used is alternating layers of Al/Ni with less than 10 nm size compounding to 0.40-0.80 mm. In other embodiments other nanofoils 210 may be used such that they produce acceptable results.

The first and second materials 102, 104 are pressed together. (See 508, FIG. 5) Pressure may be applied by weights or clamps or any other device or apparatus 108, 110 that provides adequate pressure to the two materials 102, 104 ensuring acceptable results. The bonding material is activated such that a bond is formed between the first and second material 102, 104. (See 510. FIG. 5)

Figure 1:
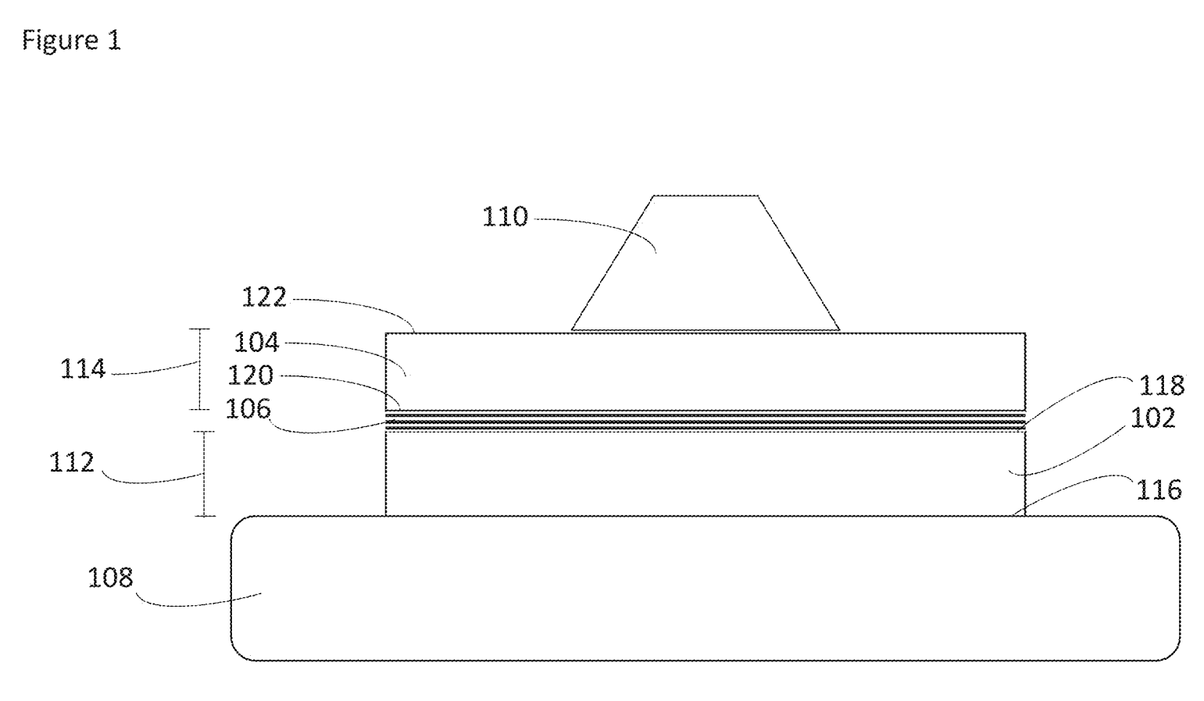
FIG. 1 is a schematic view of the method according to the invention.

In the embodiment illustrated in FIG. 1, the nanofoil 106 is ignited. The nanofoil 106 reaches a temperature of approximately 1500 degrees Celsius. The bonding material 106 bonds the first and second materials 102, 104 in nanoseconds. While bonding, the first and second materials 102, 104 are protected from the excessive heat. This type of bond can be created and used a few seconds after the bond is created.

Figure 3A:
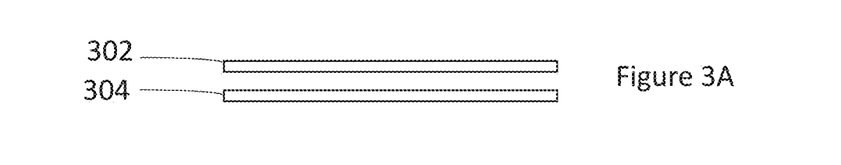
FIG. 3A is a schematic of the two materials at room temperature.
Figure 3B:
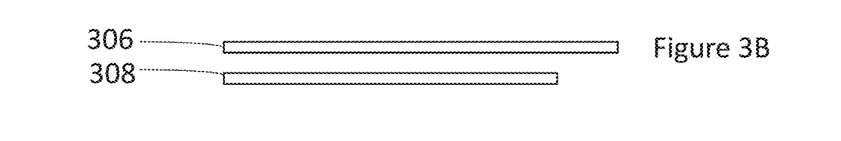
FIG. 3B is a schematic of the two materials where there is a difference in temperature between the first and second materials.
Figure 3C:
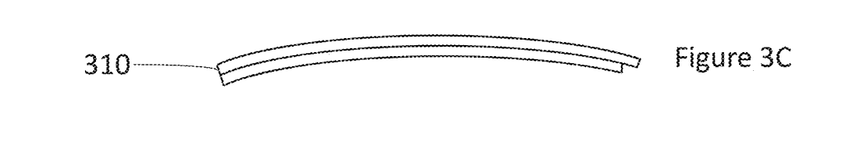
FIG. 3C is a schematic of the first and second materials bonded.

In the embodiment illustrated in FIG. 3A, when the first and second materials 302, 304 materials are at room temperature, they are approximately the same length. As illustrated in FIG. 3B, when the first material 302 is heated, it expands and is longer than the second material 304. In FIG. 3C, the first and second materials 302, 304 are bonded. When the first and second materials 302, 304 are bonded, a surface 310 is formed. As the surface 310 cools, the first material 302 that expanded while heated, will shrink as it cools. (See 512. FIG. 5) Because the first and second materials 302, 304 are bonded, the shrinking of the first material will cause the surface 310 to curve. Importantly there is no crystal deformation to either the first or second material 302, 304 in the surface 310.

Several factors will determine the exact curvature of the surface 310. They include, but are not limited to, the materials chosen and the respective coefficients of thermal expansion, the thickness of both the first and second materials 302, 304, and the first and second predetermined temperatures.

Figure 4:
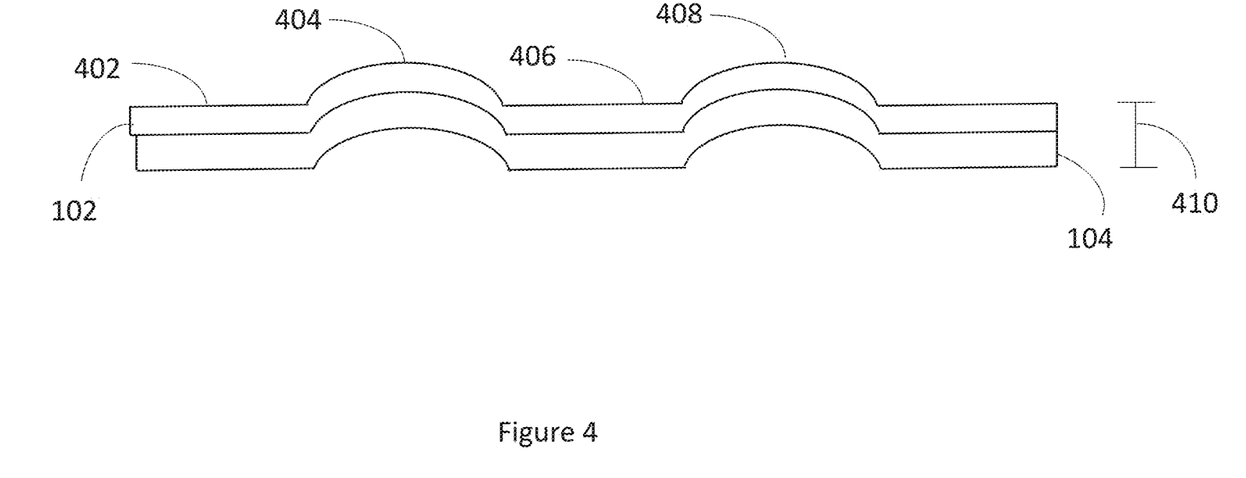
FIG. 4 is a second embodiment of the invention.

In the embodiment shown in FIG. 4, the first material 102 has several predetermined areas 404, 408. In this embodiments the first material 102 is selectively heated where some portions of the first material are at room temperature 402, 406 and some portions of the first material are at the first predetermined temperature 404, 408. After bonding the surface 410 would have several curvatures 404, 408. Each of the curvatures 404, 408 may be similar in size and degree of curvature. In further embodiments each of the curvatures 404, 408 may be different in size and degree of curvature.

Figures 6A, 6B:
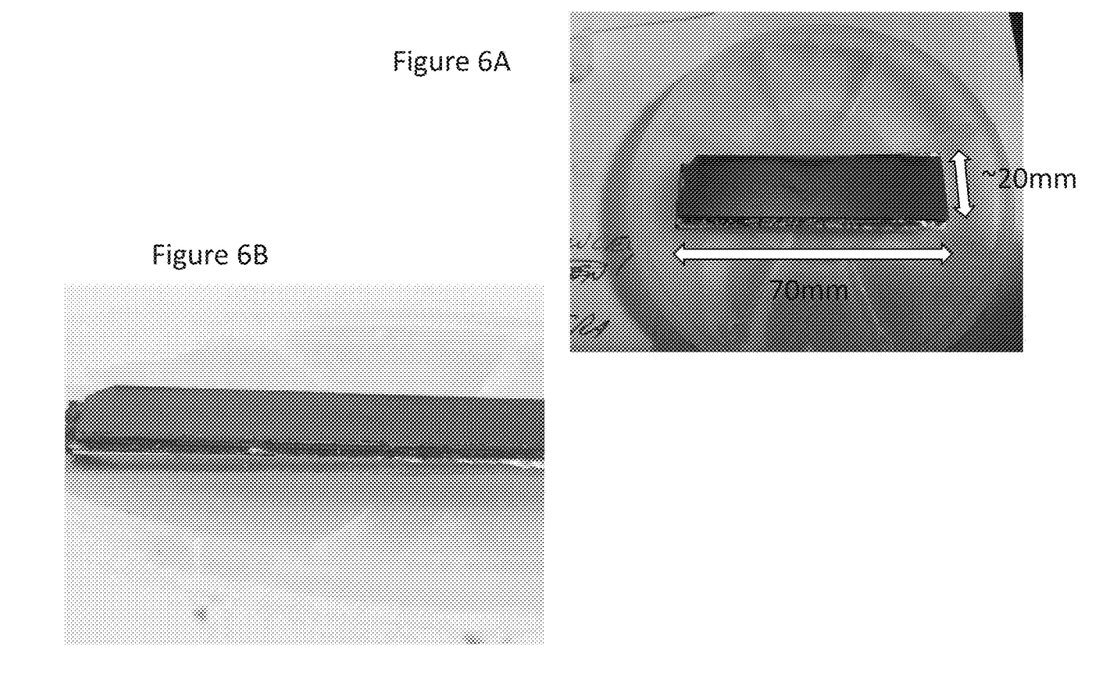
FIG. 6A is a photograph of a top view of a surface formed using one embodiment of the invention.
FIG. 6B is a photograph of a side view of a surface formed using one embodiment of the invention; and, FIG. 7 is a graph of the centerline profile of a surface made using the method according to this invention.

In the embodiment illustrated in FIGS. 6A and 6B, a surface was formed of silicon and copper. The piece of silicon was approximately 20 mm wide, 70 mm long and had a thickness of 0.5 mm. The piece of copper was approximately 20 mm wide, 70 mm long and had a thickness of 2 mm. The copper was heated to 125 Celsius on a heat plate. The silicon remained at room temperature of approximately 25 Celsius. The deposition technique described above is used on the copper and silicon. Specifically, a layer of tin is deposited on the copper. The layer of tin is approximately 2000 nanometers. A layer of titanium is deposited on the silicon. The layer of titanium is approximately 20 nanometers. A layer of gold is deposited on the layer of titanium. The layer of gold is approximately 40 nanometers. A layer of tin is deposited on the layer of gold. The layer of tin is approximately 2000 nanometers. A piece of tin coated nanofoil, such as NanoFoil® Indium Corporation, is placed in between the layers of tin and activated by ignition.

Figure 7:
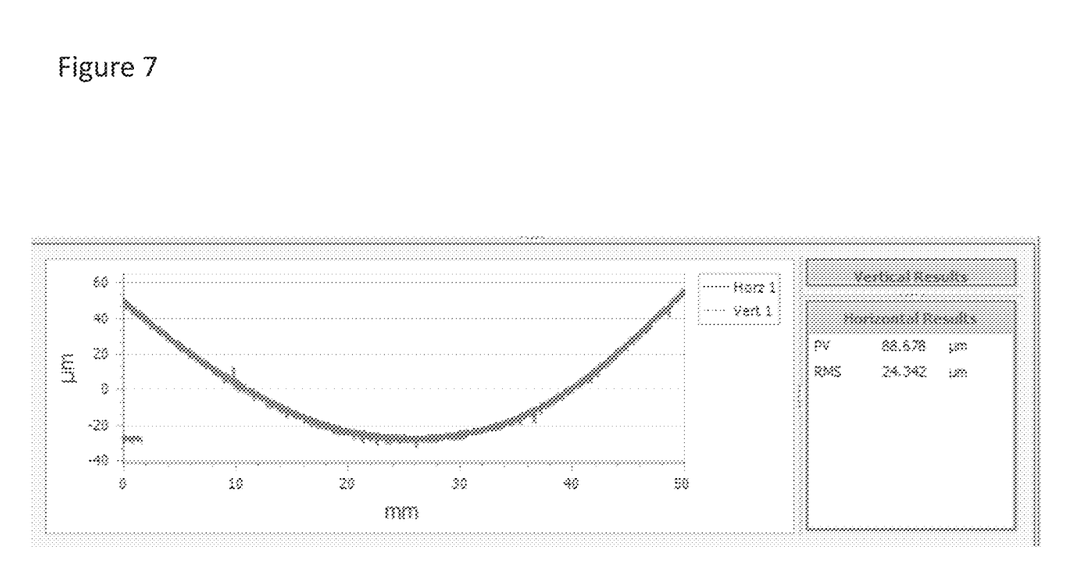

Following the bonding process, the surface was allowed to cool. The curvature achieved is illustrated in FIG. 7. The centerline profile demonstrates that the curvature achieved was approximately 88 µm.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. § 112, ¶ 6. In particular, the use of "step of" in the claims herein is not intended to invoke the provisions of 35 U.S.C. § 112, ¶ 6.

The invention claimed is:

1. A method of fabricating a curved surface comprising the steps of:
   providing a first material, the first material having a first coefficient of thermal expansion, a predetermined area of the first material having a first predetermined temperature;
   providing a second material, the second material having a second coefficient of thermal expansion, the second coefficient of thermal expansion being smaller than the first coefficient of thermal expansion, a predetermined area of the second material having a second predetermined temperature, the second predetermined temperature being cooler than the first predetermined temperature;
   providing a bonding material, the bonding material being disposed in between the first and second materials:
   pressing the first and second materials together,
   activating the bonding material such that a surface is formed;
   allowing the surface to cool such that the desired curvature is attained.

2. The method of claim 1, wherein the step of providing a bonding material further comprising the substeps of:
   depositing a first layer of tin on a second face of the first material;
   depositing a layer of titanium on a first face of the second material;
   depositing a layer of gold on the layer of titanium
   depositing a second layer of tin on the layer of gold;
   providing a nanofoil in between the first and second layers of tin.

3. The method of claim 1, wherein the step of activating the bonding material includes igniting the nanofoil.

4. The method of claim 1, wherein the first material has a plurality of predetermined areas, each of the plurality of predetermined areas having a first predetermined temperature.

5. The method of claim 1, further including positioning the first predetermined area of the first material on a heating element until the predetermined area achieves the first predetermined temperature.

6. The method of claim 1, further including positioning the second material on a cooling element until the predetermined area achieves the second predetermined temperature.

7. The method of claim 1, wherein the difference between the first predetermined temperature and the second predetermined temperature is 100 degrees Celsius.

* * * * *